United States Patent [19]

Yamamoto

[11] Patent Number: 5,275,200
[45] Date of Patent: Jan. 4, 1994

[54] OIL DRAINING CONTROL VALVE
[75] Inventor: Naoyuki Yamamoto, Tokyo, Japan
[73] Assignee: Fumoto Giken Industry Co., Ltd., Tokyo, Japan
[21] Appl. No.: 963,834
[22] Filed: Oct. 20, 1992
[30] Foreign Application Priority Data
  Apr. 10, 1992 [JP] Japan .................. 4-030840[U]
[51] Int. Cl.[5] ............................................ F16K 27/08
[52] U.S. Cl. .................................... 137/377; 137/315; 251/99; 251/288
[58] Field of Search .................. 251/99, 286, 288, 315, 251/148; 137/315, 377, 382

[56] References Cited

U.S. PATENT DOCUMENTS

| 2,121,553 | 6/1938 | Stewart et al. | 137/377 |
| 2,691,988 | 10/1954 | Weatherhead, Jr. | 137/377 |
| 3,443,789 | 5/1969 | Glasgow et al. | 137/382 |
| 4,078,763 | 3/1978 | Yamamoto | 251/315 |

*Primary Examiner*—A. Michael Chambers
*Attorney, Agent, or Firm*—Rogers, Howell & Haferkamp

[57] ABSTRACT

The oil draining control valve comprises a valve housing having a fluid passage and a shaft housing; a valve body pivotally housed in the fluid passage of the valve housing; a rotary shaft also rotatably housed in the shaft housing and engaged with the valve body to pivot the valve body from a closed position to an open position or vice versa; a control lever extending outside through a lever guide slot formed in the valve housing and engaged with the rotary shaft to pivot the valve body; and an elastic member for covering the lever guide slot formed in the valve housing at least when the control lever is pivoted at the closed position. The lever guide slot covering member is a C-shape cross-sectional annular ring, a bellow member, or a blade member, which can prevent the lever guide slot from being clogged with muddy water or grass for providing a smooth valve control operation.

11 Claims, 8 Drawing Sheets

OIL DRAINING CONTROL VALVE

BACKGROUND OF THE INVENTION

1. Field of the Invention

The present invention relates to an oil draining control valve, and more specifically to an oil draining control valve suitable for use to exchange engine oil in an oil pan for an automotive vehicle, for instance.

2. Description of the Prior Art

Conventionally, when engine oil is required to be drained from an engine of an automotive vehicle, a drain plug attached to an oil pan is first removed to drain engine oil. In the conventional way of draining engine oil, however, when the drain plug is removed, there exists a problem in that oil is jetted and scattered toward the outside through the drain port, with the result that working clothes of the worker is soiled or the scattered oil stains the floor of the workshop. In addition, when the drain plug is repeatedly attached to or detached form the oil pan, there exists another problem in that the sealing performance of the drain plug is deteriorated and therefore engine oil leaks through the drain plug.

To overcome these problems, the same inventor has already proposed an oil draining control valve which can be attached to the drain port to drain engine oil by a simple lever operation, instead of the drain plug. In this oil draining control valve, a valve body is pivotally housed in a drain passage formed in a valve housing; and a control lever extending to the outside is connected to a rotary shaft of the valve body. Therefore, when the control lever is pivoted, since the valve body is also pivoted via the rotary shaft, the drain passage is opened or closed according to the pivotal motion of the control lever.

In this prior art valve structure, however, since the control lever connected to the valve body is passed through an L-shaped lever guide opening formed in the valve housing so as to be guided along the lever guide opening, there arises another problem in that the lever guide opening is easily clogged with muddy water or grass, with the result that the control lever is not smoothly pivoted along the guide opening and further the engine oil pan is corroded by muddy water which enters through the lever guide opening. The above-mentioned problem is serious recently, in particular. This is because the outdoor leisure has become popular and therefore the vehicle often travels on non-paved roads such as muddy or gravel roads, so that mud or grass is easily caught by the oil draining control valve disposed extending downward from the engine.

SUMMARY OF THE INVENTION

With these problems in mind, therefore, it is the primary object of the present invention to provide an oil draining control valve, which can prevent the lever guide opening along which the control lever is pivoted from being clogged with mud or grass for providing a smooth valve opening/closing operation.

To achieve the above-mentioned object, the oil draining control valve according to the present invention comprises: a valve housing having a fluid passage and a shaft housing, said valve housing being attached to an oil reservoir; a valve body pivotally housed in the fluid passage of said valve housing; a rotary shaft also pivotally housed in the shaft housing of said valve housing and engaged with said valve body to pivot said valve body from a valve closed position to a valve open position or vice versa; a control lever extending outside through a lever guide slot formed in said valve housing and engaged with said rotary shaft to pivot said valve body; and means for covering the lever guide slot formed in said valve housing at least when said control lever is pivoted to the valve closed position.

The lever guide slot covering means is an elastic C-shape cross-sectional annular ring member fitted to an outer circumferential surface of the shaft housing, an elastic cylindrical bellow member attached to the shaft housing, or an elastic blade member attached to an edge of the lever guide slot. Further, the lever guide slot is formed with a partially wide portion at one end thereof at which the control valve is held under biased condition at the valve closed position.

In the oil draining control valve according to the present invention, when the control valve is attached to an oil reservoir, the fluid passage of the control valve is connected open to the inside of the oil reservoir. When the control lever is pivoted along the lever guide slot, the valve body is pivoted via the valve shaft from the closed position to the open position or vice versa. Under the closed position, the control lever is held at a partially wide portion of the lever guide slot under biased condition without being shifted due to vibration. In particular, since the lever guide slot is covered by an elastic guide slot covering means, it is possible to prevent the lever guide slot from being clogged with muddy water or grass, thus permitting a smooth control lever pivotal operation. In addition, it is possible to prevent the inside of the oil reservoir from being corroded by the muddy water entering through the lever guide slot.

BRIEF DESCRIPTION OF THE DRAWINGS

Embodiments of the present invention will be described hereinbelow with reference to the attached drawings.

Figure 1:
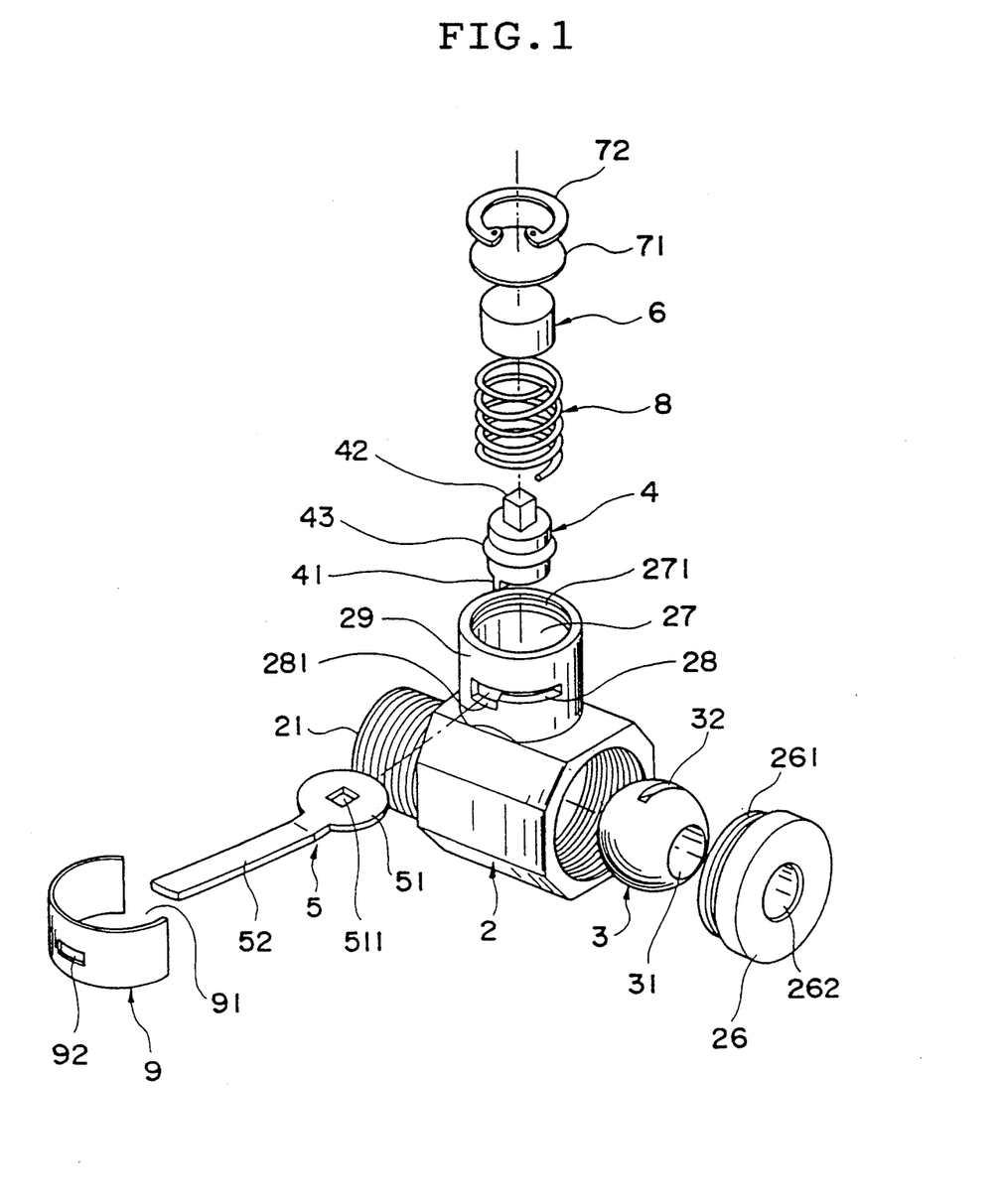
FIG. 1 is an exploded view showing a first embodiment of the control valve according to the present invention.
Figure 2A:
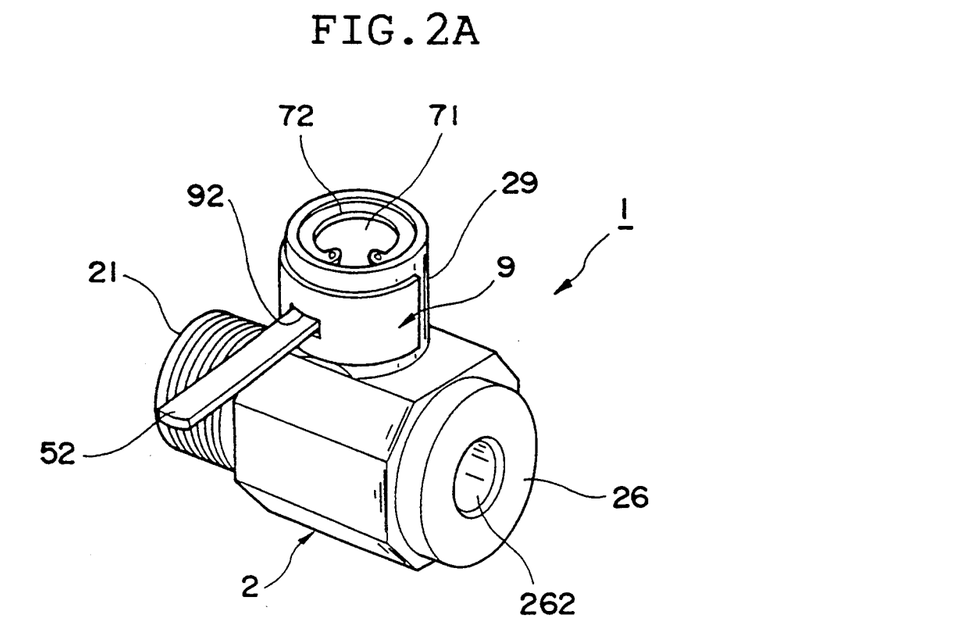
FIG. 2A is a perspective view showing the first embodiment thereof in the valve closed position.
Figure 2B:
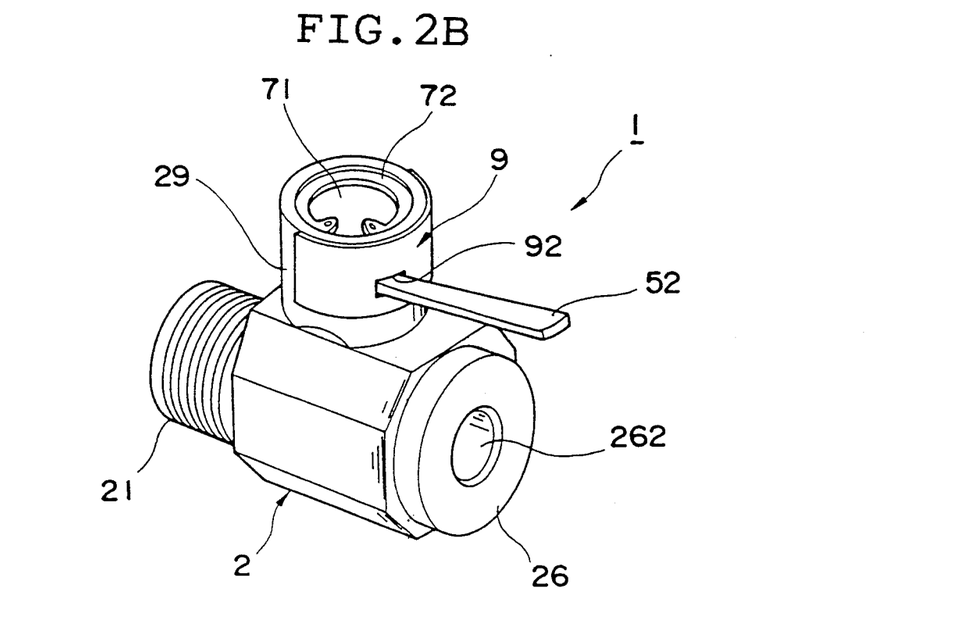
FIG. 2B is a perspective view showing the same first embodiment thereof in the valve open position.
Figure 3A:
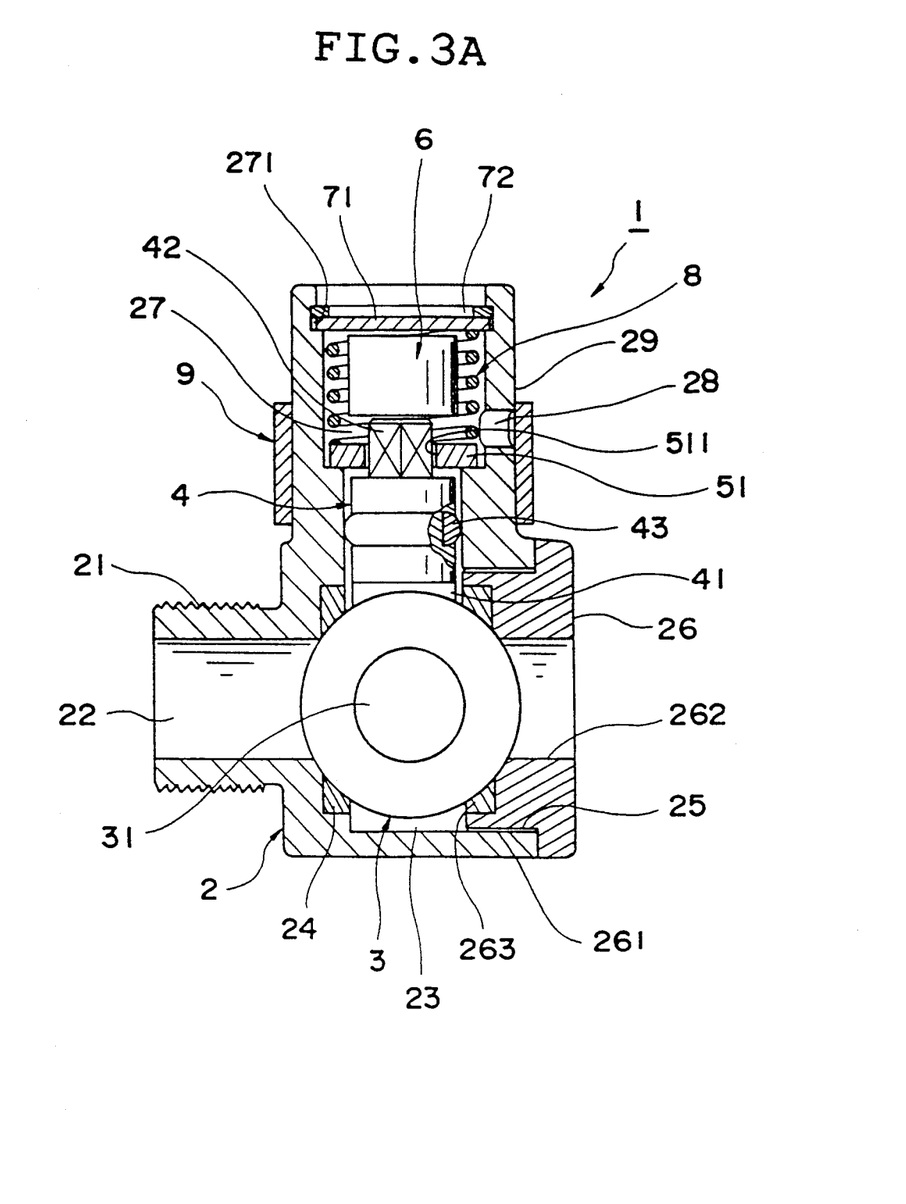
FIG. 3A is a cross-sectional view showing the first embodiment thereof in the valve closed position.
Figure 3B:
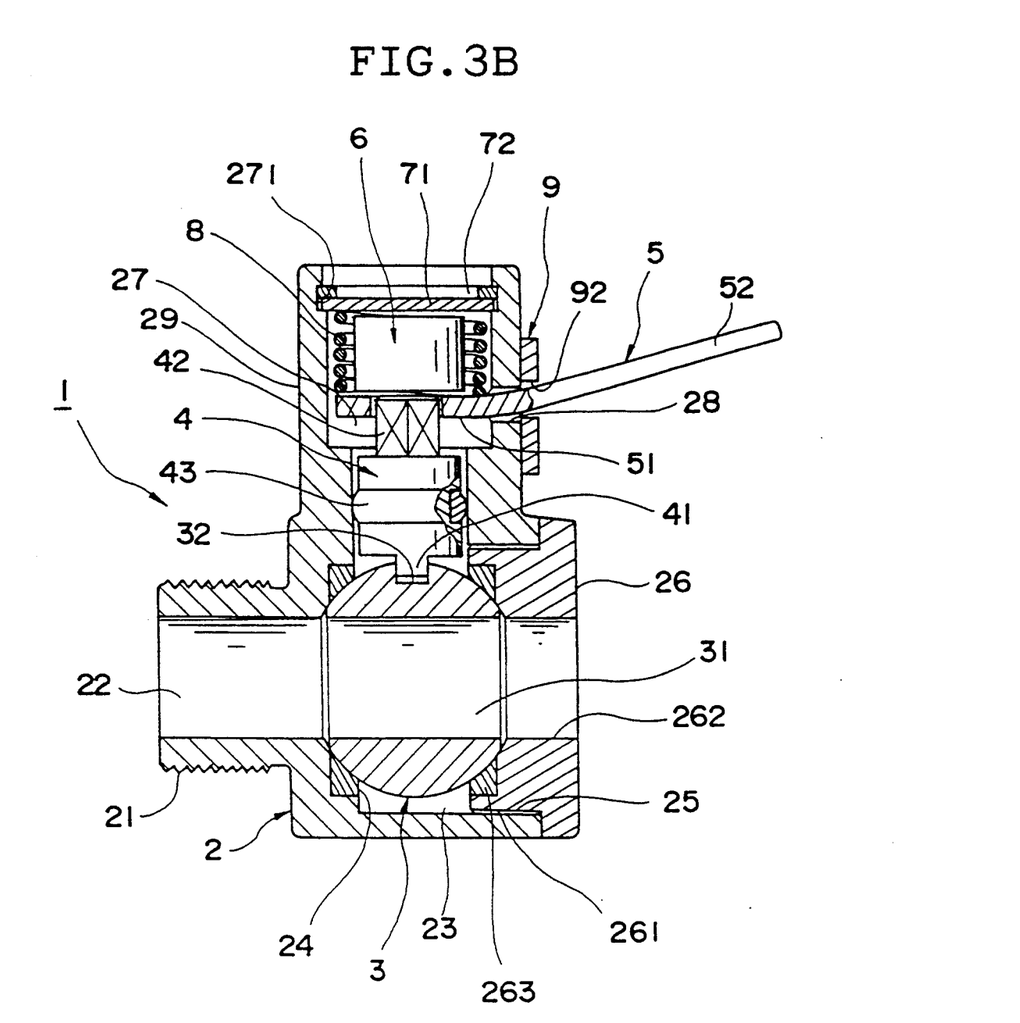
FIG. 3B is a cross-sectional view showing the same first embodiment thereof in the valve open position.

FIGS. 1, 2A and 2B, and 3A and 3B show a first embodiment thereof, in which FIGS. 2A and 3A show the valve closed status, and FIGS. 2B and 3B show the valve open status.

The control valve 1 is attached to a drain port of an oil reservoir (e.g., an oil pan under an engine mounted on an automotive vehicle), instead of a drain plug. The control valve 1 is roughly comprises a valve housing 2, a valve body 3, a rotary shaft 4, a control lever member 5, a spacer 6, a spring 8, a lever cover member 9, and a valve cover 26. The valve body 2 is formed with an oil passage 22 and a valve chamber 23 (both shown in FIG. 3A), an outer circumferential threaded portion 21 screwed into a drain port of the oil pan, and with an inner circumferential threaded portion 25 engaged with an outer circumferential threaded portion 261 of the valve cover 26. The oil passage 22 communicates with the oil pan when the control valve 1 is attached to the drain port of the oil pan, and the oil chamber 23 communicates with another oil passage 262 of the valve cover 26.

The spherical valve body 3 is formed with a straight passage 31 at the center thereof and an engage groove 32, and is housed slidably and pivotally within the valve chamber 23 via an annular sealing member 24 on the left (threaded portion 21) side and via another annular sealing member 263 on the right (valve cover member 26) side as shown in FIG. 3A. The diameter of the straight passage 31 is roughly the same as those of the oil passages 22 and 262 when the straight passage 31 of the valve body 3 is aligned therewith.

Therefore, when the valve body 3 is so pivoted in the direction that the straight oil passage 31 intersects with the oil passages 22 and 262, as depicted in FIG. 3A, valve 1 is closed. Under these conditions, the annular sealing members 24 and 263 are in tight contact with the outer spherical surface of the valve body 3 to prevent oil leakage. On the other hand, when the valve body 3 is so pivoted in the opposite direction that the straight oil passage 31 is aligned with the oil passages 22 and 262, as depicted in FIG. 3B, valve 1 is opened. Under these conditions, the oil flows through the valve 1 to drain oil for oil removal.

On the other hand, the valve housing 2 is further formed with a cylindrical shaft housing 27. On the circumferential surface of this shaft housing 27, an arcuate lever guide slot 28 having a partially wide portion 281 is formed over such an angular range that the control lever member 5 can be pivoted 90 degrees around the axis of the cylindrical shaft housing 27. Within this cylindrical shaft housing 27, a rotary shaft 4 formed with an upper square pole 42 and a lower engage projection 41 is housed via a seal ring 43 to further improve the sealing performance of the valve 1, as shown in FIG. 3A.

The control lever member 5 is formed with a base portion 51 having a square hole 511 at the center thereof and a lever portion 52. Further, the control lever member 5 is passed through the lever guide slot 28 of the cylindrical shaft housing 27. The square pole 42 of the rotary shaft 4 is engaged with a square hole 511 of the control lever member 5, and the engage projection 41 of the rotary shaft 4 is engaged with the engage groove 32 formed in the valve body 3 to pivot the valve body 3 from the valve closed position to the valve open position or vice vera when the control lever member 5 is pivoted along the lever guide slot 28. This rotary shaft 4 is also pivotally housed within the cylindrical shaft housing 27 and urged downward by a compressive spring 8 elastically supported between a base portion 51 of the control lever member 5 and a lid 71 retained by a retainer 72 with a spacer 6 inserted into the central space of the spring 8.

In assembly, the spherical valve body 3 is inserted into the valve chamber 23 with the sealing member 24 disposed therebetween and the valve cover 26 is screwed into the valve housing 2 with the sealing member 263 disposed therebetween. Thereafter, the rotary shaft 4 is inserted into the cylindrical shaft housing 27 from above by engaging the engage projection 41 of the rotary shaft 4 with the engage groove 32 of the valve body 3. The control lever member 5 is passed through the lever guide slot 28 of the cylindrical shaft housing 27, and the square hole 511 of the lever member 5 is engaged with the square pole 42 of the rotary shaft 4. Further, the spring 8, the spacer 6, the lid 71, and the retainer 72 are inserted into the cylindrical shaft housing 27 in the order described above.

In operation, when the control lever member 5 is pivoted to such an angular position that the lever portion 52 of the control lever 5 is perpendicular to the axis of the valve housing 2 as shown in FIGS. 2A and 3A, since the fluid passage 31 of the spherical valve body 3 does not communicate with the fluid passage 22 of the valve housing 2, the valve 1 is closed and therefore fluid is not passed therethrough. Under these conditions, since the control lever member 5 is located in the wide portion 281 of the lever guide slot 28 and additionally urged downward by the compressive spring 8, it is possible to securely maintain the control lever member 5 at the valve closed position, without being dislocated to the valve open position due to engine vibration, for instance.

On the other hand, when the control lever member 5 is moved upward against the compressive spring 8 and further pivoted along the lever guide slot 28 to such an angular position that the lever portion 52 of the control lever 5 is in parallel to the axis of the valve housing 2 as shown in FIGS. 2B and 3B, the valve 1 is opened and therefore fluid can be therethrough. Accordingly, the worker can recognizes the valve closed and open positions by confirming the direction of the control lever member 5 relative to the valve housing 2.

In the control valve 1 as described above, an elastic lever cover means 9 as depicted in FIG. 1 is additionally provided for the control lever member 5. In the first embodiment, this lever cover means 9 is an elastic C-shape cross-sectional cover member formed by cutting a cylindrical body so as to have a cutout portion 91. The arcuate length of the lever cover member 9 is long enough to completely cover the lever guide slot 28 including the partially wide portion 281, irrespective of the valve closed or open position of the control lever member 5, as shown in FIGS. 2A and 2B. That is, the arcuate portion of the lever cover member 9 extends over 180 degrees or preferably over 200 degrees in angular range around the axis of the valve shaft housing 27.

Further, the cover member 9 is formed with a slot 92 at the middle portion thereof, through which the control lever member 5 is passed. In this first embodiment, the lever cover member 9 is slidably attached to the outer circumferential surface (lever cover attaching portion) 29 of the shaft housing 27. That is, after the control lever member 5 has been passed through the slot 92, the cover member 9 is widened open so that the cutout portion 91 thereof is tightly fitted onto the circumferential surface 29 of the shaft housing 27.

The elasticity of the elastic cover member 9 is such that the cover member 9 is not deformed or damaged when fitted onto the surface 29. That is, the material of this cover member 9 is any of various rubbers such as neoprene, EPT rubber, etc.; various elastomers; various resins such as hard vinyl chloride, polypropylene, polyethylene, ABS resin, polyphenyleneoxide (PPO), nylon, polyacetal (POM), phenol resin, polyphenylenesulfide (PPS), polyethersulfone (PES), polyetheretherketone (PEEK), teflon; elastic metals; etc.

In this first embodiment, since the lever cover member 9 as described above is attached to the cylindrical shaft housing 27 so as to cover the lever guide slot 28 irrespective of the pivotal position of the control lever 5, it is possible to securely prevent muddy water or grass from entering through the lever guide slot 28 or further into the shaft housing 27.

A second embodiment of the present invention will be described hereinbelow with reference to FIGS. 4A and 4B, and 5A and 5B. In this embodiment, the elastic lever cover means 9 is a cylindrical elastic bellow member of open bottom type. This bellow member 9 is formed with an inner circumferential engage projection 94 engaged with an outer circumferential engage groove (lever cover attaching portion) 29 formed on the outer circumferential surface of the shaft housing 27.

Figure 4A:
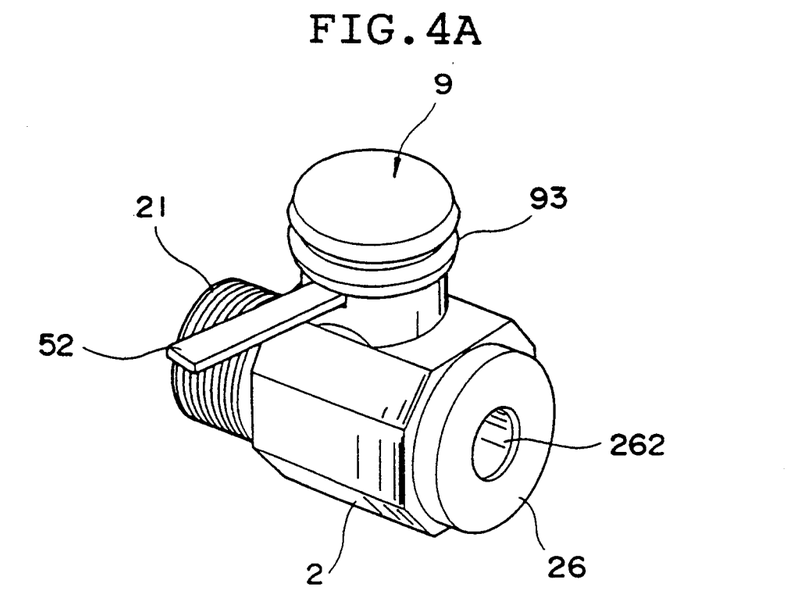
FIG. 4A is a perspective view showing a second embodiment thereof in the valve closed position.
Figure 4B:
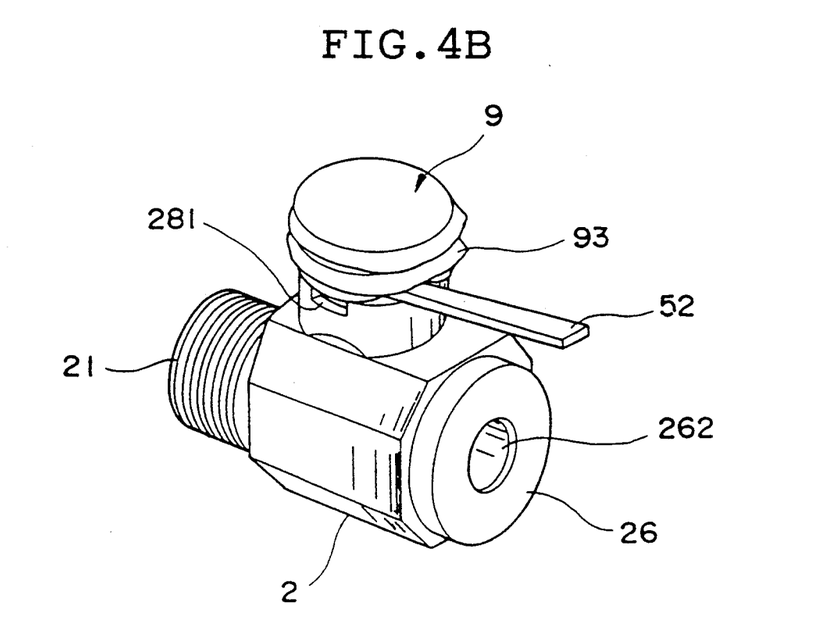
FIG. 4B is a perspective view showing the same second embodiment thereof in the valve open position.
Figure 5A:
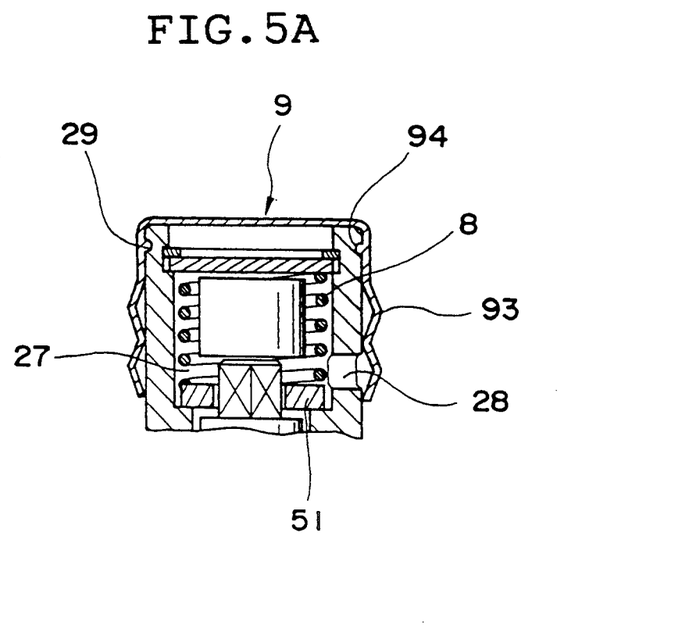
FIG. 5A is a cross-sectional view showing the second embodiment thereof in the valve closed position.
Figure 5B:
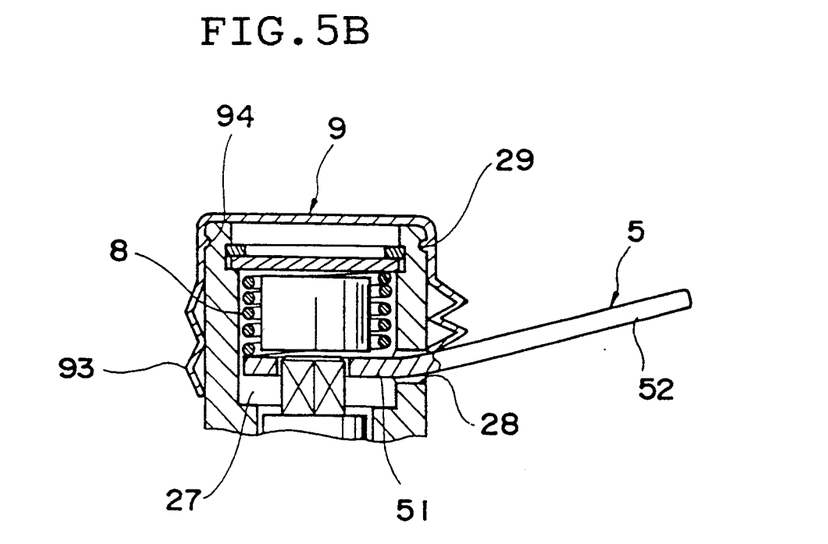
FIG. 5B is a cross-sectional view showing the same second embodiment thereof in the valve open position.

Therefore, when the lever cover bellow member 9 is attached to the shaft housing 27 with the engage projection 94 engaged with the engage groove 29, since the bellow member 9 is firmly attached to the shaft housing 27, it is possible to cover the lever guide slot 28. In this embodiment, when the control lever member 5 is pivoted to the valve open position, the bellow portion 93 of the bellow member 9 is easily moved upward without preventing the pivotal motion of the control lever member 5, as shown in FIG. 4B; and when pivoted to the valve closed position, the bellow portion 93 thereof is returned to its home position to completely cover the lever guide slot 28, as shown in FIG. 4A.

A third embodiment of the present invention will be described hereinbelow with reference to FIGS. 6A and 6B, and 7A and 7B.

In this embodiment, the elastic lever cover means 9 is an elastic blade cover member. The upper fixed end portion thereof is bonded with a bonding agent to an inner groove (lever cover attaching portion) 29 formed along the inner upper edge of the lever guide slot 28 formed in the shaft housing 27, and the lower free end portion thereof 95 is in contact with the outer lower edge of the lever guide slot 28. Further, it is preferable to decrease the thickness of the blade cover member 9 gradually from the upper fixed end to the lower free end thereof, as shown in FIGS. 7A and 7B.

The elastic material of the blade cover member 9 is any of various rubbers such as natural rubber, chloroprene rubber, nitrile rubber, butyl rubber, fluorine rubber, isoprene rubber, butadiene rubber, styrenebutadiene rubber, ethylene propylene rubber, silicone rubber, etc.; and soft resins such as soft polyvinyl chloride, polyethylene, polypropylene, ionomer resin, fluorine resin, silicone resin, etc.

Figure 6A:
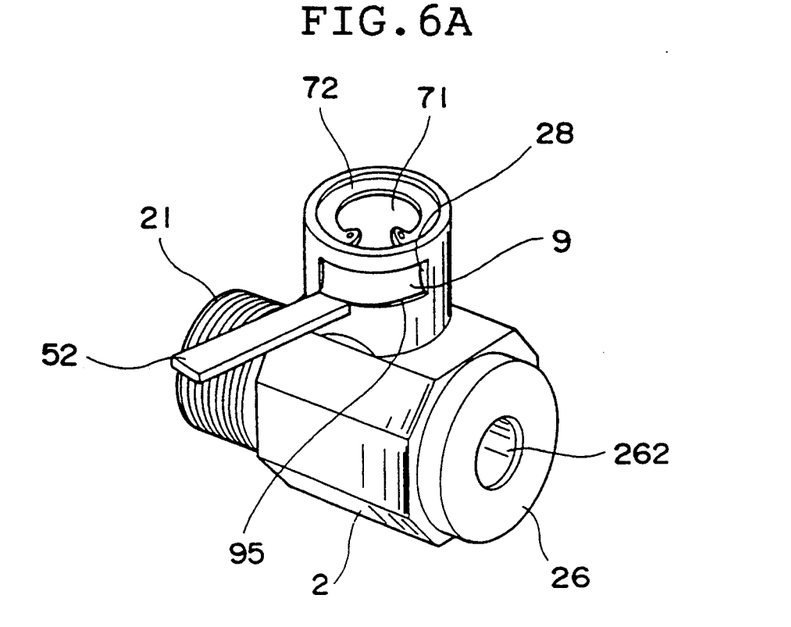
FIG. 6A is a perspective view showing a third embodiment thereof in the valve closed position.
Figure 6B:
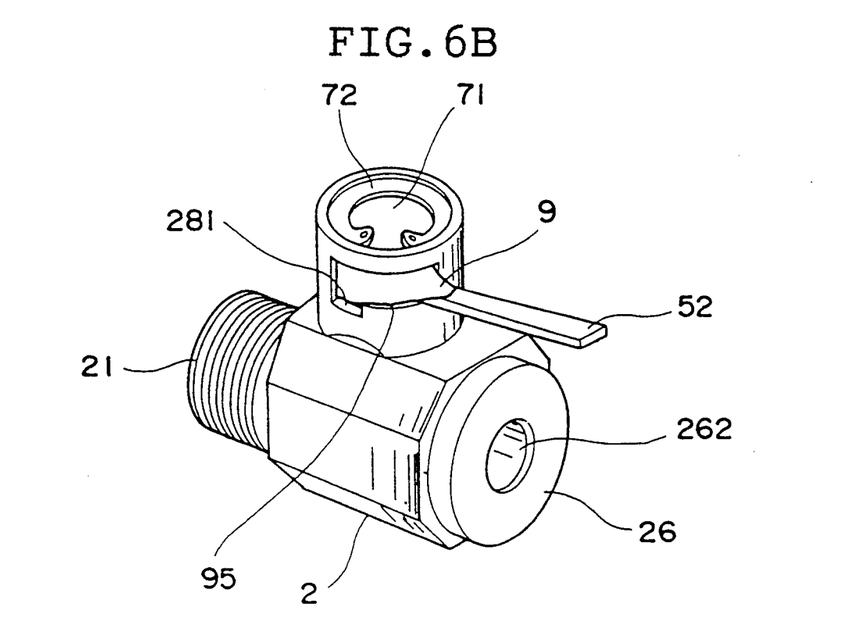
FIG. 6B is a perspective view showing the same third embodiment thereof in the valve open position.
Figure 7A:
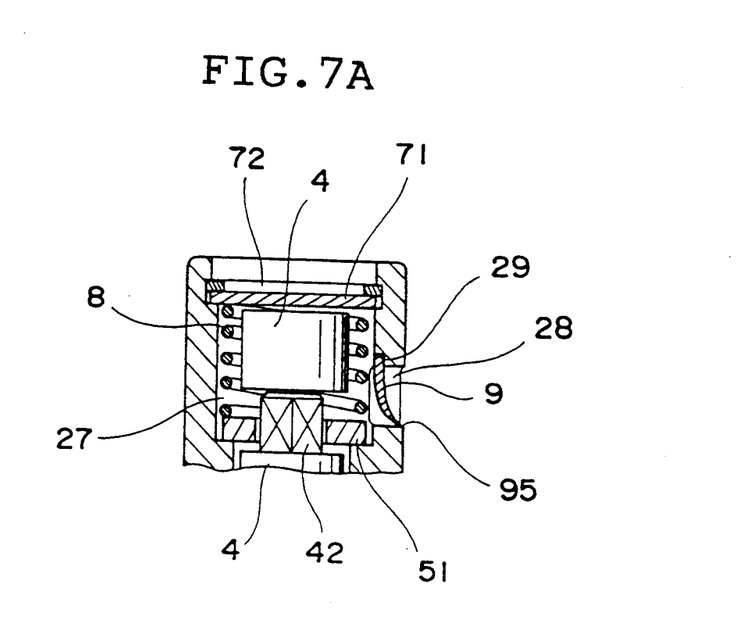
FIG. 7A is a cross-sectional view showing the third embodiment thereof in the valve closed position.
Figure 7B:
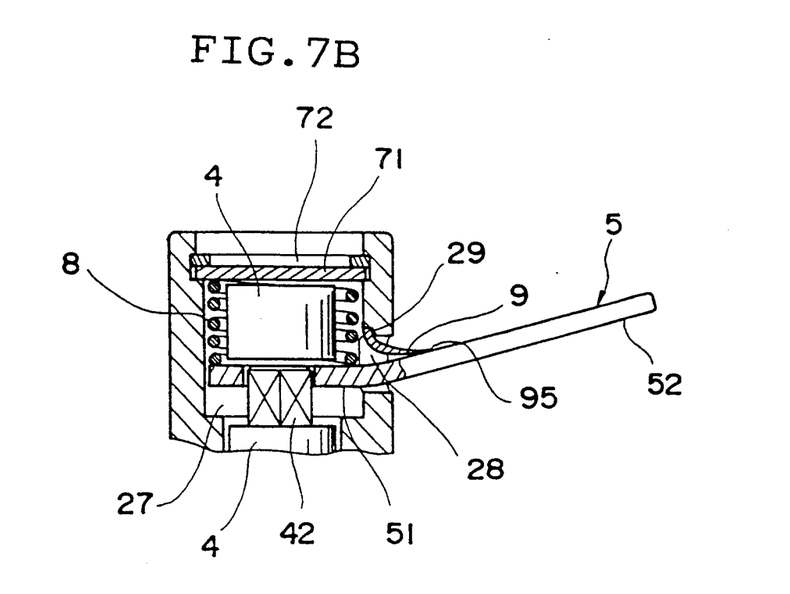
FIG. 7B is a cross-sectional view showing the same third embodiment thereof in the valve open position.

Therefore, when the blade cover member 9 is appropriately bonded to the shaft housing 27 with the upper fixed end thereof fitted to the inner groove 29 of the shaft housing 27, as shown in FIGS. 6 and 7, it is possible to cover the lever guide slot 28. In this embodiment, when the control lever member 5 is pivoted to the valve open position, the free end portion 95 of the blade member 9 is moved outward without preventing the control lever member 5 from being pivoted, as shown in FIG. 6B; and when pivoted to the valve closed position, the free end portion 95 thereof is returned to its home position to perfectly cover the lever guide slot 28, as shown in FIG. 6A.

As described above, in the oil draining control valve according to the present invention, the lever cover member 9 can be attached simply to the shaft housing 27 of the valve housing 2 without modifying the structure of the control valve 1, and further the control lever 5 can be pivoted from the valve closed position to the valve open position or vice versa without removing any member.

The embodiments of the present invention have been described when applied to an oil draining control valve used with an oil pan for an automotive vehicle by way of example. Without being limited thereto, however, the oil draining control valve according to the present invention can be of course applied to any other devices from which oil is required to be drained.

As described above, in the oil draining control valve according to the present invention, since the lever cover means is additionally provided to cover the lever guide slot along which the control lever is pivoted form the valve closed position to the valve open position, it is possible to prevent the slot from being clogged with muddy water or grass and further prevent the oil pan from being corroded by the muddy water entering through the guide slot, thus allowing a smooth valve pivotal operation.

What is claimed is:

1. An oil draining control valve comprising:
   a valve housing having a fluid passage and a shaft housing, said valve housing being attached to an oil reservoir;
   a valve body pivotally housed in the fluid passage of said valve housing;
   a rotary shaft also pivotally housed in the shaft housing of said valve housing and engaged with said valve body to pivot said valve body from a valve closed position to a valve open position or vice versa;
   a control lever extending outside through a lever guide slot formed in said valve housing and engaged with said rotary shaft to pivot said valve body; and
   means for covering the lever guide slot formed in the shaft housing of said valve housing at least when said control lever is in the valve closed position.

2. The oil draining control valve of claim 1, wherein said covering means includes an elastic cylindrical bellow member attached to the shaft housing of said valve housing to cover the lever guide slot at the valve closed position.

3. The oil draining control valve of claim 1, wherein said covering means includes an elastic blade member attached to an edge of the lever guide slot to cover the lever guide slot at the valve closed position.

4. The oil draining control valve of claim 1, wherein the lever guide slot is formed with a partially wide portion at one end thereof at which said control lever is held under biased condition at the valve closed position.

5. The oil draining control valve of claim 1, wherein the oil reservoir is an oil pan provided under an engine for an automotive vehicle.

6. An oil draining control valve as set forth in claim 1, wherein the valve housing includes an outlet opening through which oil from the oil reservoir may drain out of the valve housing, and the covering means does not cover the outlet opening.

7. An oil draining valve as set forth in claim 1 wherein said covering means shields the valve from contaminants from an external environment, yet provides access to the control lever from the external environment.

8. An oil draining control valve comprising:
a valve housing having a fluid passage and a shaft housing, said valve housing being adapted to be attached to an oil reservoir;
a valve body pivotally housed in the fluid passage of said valve housing;
a rotary shaft also pivotally housed in the shaft housing of said valve housing and engaged with said valve body to pivot said valve body from a valve closed position to a valve open position or vice versa;
a control lever extending outside through a lever guide slot formed in said valve housing and engaged with said rotary shaft to pivot said valve body; and
means for covering the lever guide slot formed in the shaft housing of said valve housing at least when said control lever is in the valve closed position, wherein the covering means does not urge the control lever from the valve open position to the valve closed position when the control lever is in the valve open position or vice versa when the control lever is in the valve closed position.

9. An oil draining control valve as set forth in claim 8, wherein the valve housing includes an outlet opening through which oil from the oil reservoir may drain out of the valve housing, and the covering means does not cover the outlet opening.

10. An oil draining valve as set forth in claim 8 wherein said covering means shields the valve from contaminants from an external environment, yet provides access to the control lever from the external environment.

11. An oil draining control valve, comprising:
a valve housing having a fluid passage and a shaft housing, said valve housing being adapted to be attached to an oil reservoir;
a valve body pivotably housed in the fluid passage of said valve housing;
a rotary shaft also pivotably housed in the shaft housing of said valve housing and engaged with said valve body to pivot said valve body from a valve closed position to a valve open position or vice versa;
a control lever extending outside through a lever guide slot formed in said valve housing and engaged with said rotary shaft to pivot said valve body; and
means for covering the lever guide slot formed in the shaft housing of said valve housing at least when said control lever is in the valve closed position, said covering means including an elastic C-shaped cross-sectional annular ring formed with a slot through which said control lever is passed and fitted to an outer circumferential surface of the shaft housing of said valve housing to cover the lever guide slot, irrespective of the valve closed and open positions.

* * * * *